July 5, 1966  J. D. ROCHFORT  3,259,310
RATIO INDICATOR
Filed July 6, 1964
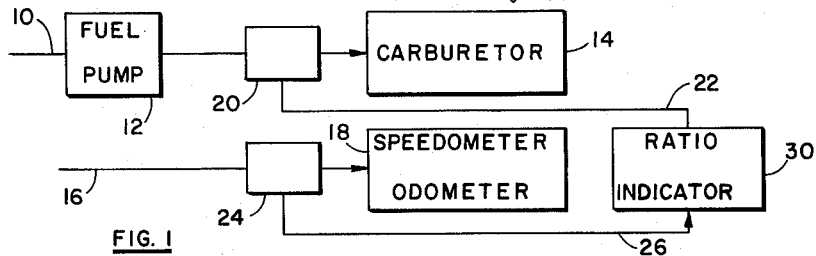
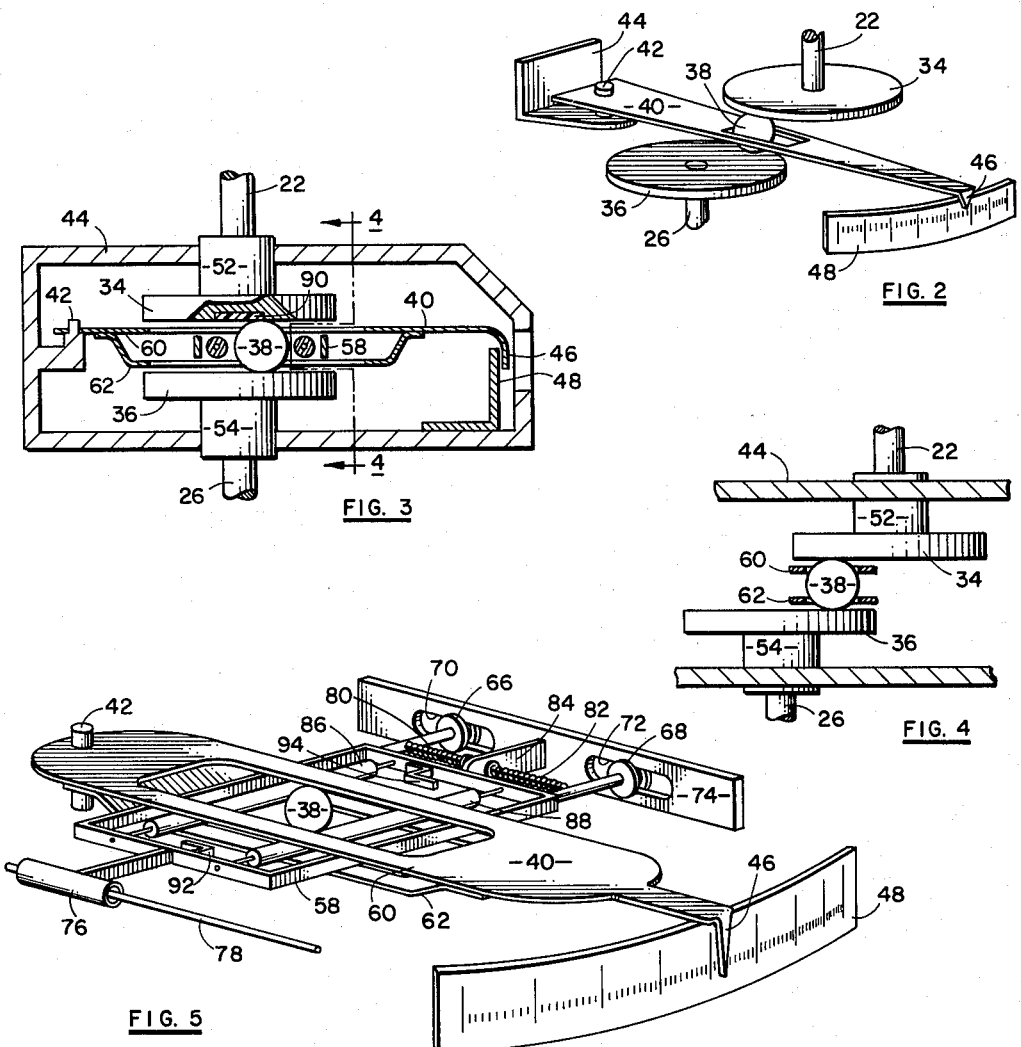
INVENTOR.
JEAN D. ROCHFORT
BY Donald J. Ellingsberg
AGENT

United States Patent Office 3,259,310
Patented July 5, 1966

3,259,310
RATIO INDICATOR
Jean D. Rochfort, 385 Royal Ave., Box 192, Simi, Calif.
Filed July 6, 1964, Ser. No. 380,239
2 Claims. (Cl. 235—61)

The present invention relates to a ratio indicator.

Industrial operations require a ratio indicator to constantly monitor and, where required, control the ratio between two or more variables. These variables can have many forms. The ratio between two variables can be forms such as velocity/time, engine revolutions/time, fuel flow/velocity, and fuel flow/time. The blending on a relatively continuous basis of fuels, paints, concrete or any composite product are all examples of ratios having more than two variables which must be precisely controlled to produce the final product.

Maximizing fuel economy during the operation of a motor vehicle is highly desirable and can be accomplished by constantly monitoring at least two variables. A ratio indicator appraises the vehicle operator of fuel consumption and enables the operator to select optimum vehicle speeds to match operating conditions. The ratio indicator can also be an efficiency monitor of the motor vehicle and advise the operator of system defects or malfunctions.

Miles per gallon meters, which are one known form of ratio indicator, are generally complex devices. And their complexity makes them not only expensive but also difficult to produce, maintain, and repair. Further, these meters are relatively difficult to install on a motor vehicle. Because of these and other reasons, the known meters have not been commercially acceptable.

Accordingly, it is an object of the present invention to provide a new and improved ratio indicator to compare at least two variables and indicate the relationship therebetween.

Another object of the invention is to provide a ratio indicator to compare at least two variables and regulate the relationship therebetween.

A further object of the invention is to provide a ratio indicator to monitor at least two variables.

Yet another object of the invention is to provide a ratio indicator which continuously indicates a ratio between at least two variables by mechanically comparing the variables.

Still another object of the invention is to provide a ratio indicator to continuously compare the rate of movement of a motor vehicle and the rate of fuel flow.

Another object is to provide a ratio indicator having an extended usable life which is easily manufactured, relatively inexpensive, inherently accurate, and has increased reliability.

Briefly, in accordance with a preferred embodiment of my invention, a ratio indicator is provided having at least first and second rotating members spaced apart by a rolling means which is positioned therebetween and driven by each rotating member, and a follower means acted upon by the rolling means so that for any ratio of rates between the rotating members there is only one position relative to each of the rotating members that the rolling means can occupy without substantial slippage. This position is the function of the ratio of the two variables, i.e. each variable determined by the respective rotating member, and is indicated on a suitably calibrated dial by the follower means.

Further objects, features, and the attending advantages of the invention will become apparent with regard to the following description read in conjunction with the accompanying drawing in which:

FIGURE 1 is a schematic diagram showing the present invention in a preferred operating position;

FIGURE 2 is a schematic perspective view of the principle of operation of the invention;

FIGURE 3 is a sectional side elevation of a preferred embodiment of the ratio indicator of the present invention;

FIGURE 4 is a sectional view, partly broken away, along line 4—4 of FIGURE 3; and FIGURE 5 is an enlarged perspective view of a portion of the ratio indicator as shown by FIGURE 3.

Referring to the drawing, and particularly to FIGURE 1, a motor vehicle is a preferred operating embodiment for the ratio indicator of my invention. In a conventional manner, fuel from a tank (not shown) passes through a fuel line 10 to a fuel pump 12 and then to a carburetor 14. A flexible cable 16 from the motor vehicle wheels or drive train (not shown) is connected to a conventional speedometer-odometer 18.

The flow of fuel through fuel line 10 actuates a conventional fluid displacement motor 20 which drives a flexible cable or shaft 22. A suitable gear arrangement 24, e.g. worm and worm wheel, is actuated by the flexible cable 16 and drives a flexible cable or shaft 26. Cables 22 and 26 provide a fuel rate input and a velocity or rate of movement input, respectively, to a ratio indicator 30 formed in accordance with my invention.

In FIGURE 2, the ratio indicator of the invention has been reduced to a schematic showing in order to better understand the principle of operation and the detailed description, hereinafter, of a preferred embodiment of my invention as shown by the remaining figures. One variable input such as the rate of fuel flow is a proportional input through cable 22 to a rotatable member or disc 34. A second variable input such as the velocity or rate of movement is a proportional input through cable 26 to a rotatable member or disc 36. The discs 34 and 36 are suitably positioned, preferably in parallel planes, and spaced apart with the rotational axes offset a distance slightly less than the radius of either disc. The diameters of each of the discs are preferably substantially equal.

A rolling means such as ball 38 is rotatably positioned between the spaced-apart discs 34 and 36. The discs are positioned for rotation in opposite directions so that each disc imparts a spin to the ball 38. Contact pressure between the ball and the discs can be maintained by a suitable spring means such as a Belleville spring (not shown).

The principle of operation of the ratio indicator shown by FIGURE 2 depends upon the previously described discs 34 and 36, with the ball 38 freely positioned therebetween. Two input variables or rates such as the rate of fuel flow and the rate of vehicle movement are expressed by the rotating discs. For any ratio between the rotating discs there is only one null position between the disc centers or rotational axes that the ball 38 can occupy and maintain rolling contact with both discs without skidding or slippage. Since the ball 38 is freely positioned between the discs 34 and 36, it can be made to respond to variations in respective input rates by moving toward the rotating axis of the more rapidly rotating disc. Thus, as the ratio of velocities of the rotating discs change as the input rates to each disc change, the ball can be made to move toward the one position it can occupy without slippage.

Movement of the ball 38 between the rotational axes of the discs 34 and 36 is followed by a ball follower or indicator 40. The ball follower 40 is pivotally supported at pin 42 by a suitable frame member 44. Ball follower 40 can be formed into a pointer 46 at its free end which passes arcuately across the face of a calibrated dial 48. This enables an operator to directly readout the ratio of the two input rates. This ratio reading is continuous and instantaneous. It is contemplated that the pointer 46 or the ball follower 40 can be used to actuate suitable control switches or servomechanisms where desired and thereby control the ratio.

Referring now to FIGURES 3 through 5, a specific or preferred embodiment of my invention is shown. Like parts previously described and present in the several figures are identified by the same reference numeral. Discs 34 and 36 are rotatably positioned by frame 44 in the preferred spaced-apart, parallel planes with ball 38 therebetween in rolling contact with both disc surfaces. Disc 34 is driven by cable 22 through a conventional overrunning clutch 52 as the proportional input of the rate of fuel flow. Disc 36 is driven by cable 26 through a similar clutch 54 as the proportional input of the rate of movement of the motor vehicle. Although the proportional inputs to discs 34 and 36 yield slow-speed operation of the ratio indicator and corresponding long mechanical life, certain rapid changes in input rates or reverse directional rotation of a disc such as disc 36 necessitate the use of the conventional overrunning clutches to minimize metallic scuffing of the disc surfaces.

Movement of the ball 38 is followed by ball follower 40 and by a ball guide or error detector 58 which is positioned between the spaced-apart members 60 and 62 of the ball follower 40. While the ball follower is pivotally supported by pin 42, the error detector 58 is movably supported on wheels 66 and 68 which roll in slots 70 and 72, respectively, in plate 74. Error detector 58 is further supported by guide 76 which cooperates with rod 78. The error detector 58 is thus constrained to move in a lateral direction, i.e. normal to the centerline of the error detector and to the plane defined by the rotational axes of discs 34 and 36.

Suitable springs 80 and 82 act upon the error detector 58 and an intermediate post 84 carried by plate 74. The springs are suitably stopped to limit the degree of extension for each spring and thus avoid hunting as the springs 80 and 82 continuously urge the error detector to a centerline position coincident with the plane defined by the rotational axes of the discs 34 and 36. The lateral spring-loading of the error detector 58 urges the ball 38 to the centerline position as the ball seeks the null position on the centerline that it can occupy without slippage. During lateral movement of the ball 38 from the centerline, it is physically in rolling contact with respective ones of roller guides 86 and 88 carried by the error detector 58.

Whenever a discrepancy develops between the disc rate ratio and the ball null position, the ball 38 and the error detector 58 move laterally from the centerline in an appropriate direction. As the ball is moved to the off centerline position, the equilibrium of the system is disturbed. A vector analysis reveals an unbalanced vector acting to move the ball 38 toward the center of the disc which is relatively faster than at the prior instant. This increment of movement of the ball by the unbalanced vector force tends to reduce the developed discrepancy, and this further reduces the lateral displacement of the ball 38 and the error detector 58 from the centerline. This movement process continues until the discrepancy between the disc rate ratio and the ball position is eliminated. The foregoing can be completed by the error detector 58 in one or several increments of movement or correction; however, the ball 38 is returned to the desired null position and the error thereby reduced to zero.

There are certain instances when the ball 38, as it moves along the centerline toward the rotational axis of the faster or more rapidly rotating disc, will overshoot and center on the disc axis. Discs 34 and 36 accordingly have a similar non-metallic insert 90 placed at the rotational axis to minimize scuffing of the disc surfaces. Further, error detector 58 has suitable springs such as leaf springs 92 and 94 to urge the ball 38 from such a centered position to the desired null position which is an eccentric relationship between the rotational axes.

Operatively, as the input rates to the discs 34 and 36 vary, the ball 38 will move along the desired centerline defined by the rotational axes of the discs until it occupies the one null position where it has rolling contact with each of the discs and substantially no slippage. As the ball seeks this position, the error detector 58 continuously urges the ball toward the centerline and maintains the ball on the centerline when no error is present. As the ball 38 moves to the null position which corresponds to the ratio of the two input disc rates, its movement is followed by the ball follower 40. The pointer 46 provides visual readout in the preferred embodiment of the ratio, e.g. miles per gallon of fuel, on the suitably calibrated dial 48.

As will be evidenced from the foregoing description, certain aspects of my invention are not limited to the particular details of construction as illustrated and it is contemplated that modifications and other applications will occur to those skilled in the art. For example, it is contemplated that geometrical surfaces other than the flat discs can be utilized in my invention. Further, a rolling means such as a disc or wheel can be utilized instead of the ball as shown. It is also contemplated that fixed or movable curved guide surfaces can be used with the error detector rather than the roller guides as shown. It is therefore intended that the appended claims shall cover such modifications and applications that do not depart from the true spirit and scope of my invention.

Having described my invention, what I claim as new and desire to secure by Letters Patent of the United States is:

1. A ratio indicator which comprises:
  (a) respective ones of a first and a second drive means suitably interconnected with associated ones of a first and second disc means positioned in a substantially parallel and spaced apart relationship, said first and second disc means defining respective first and second rotational axes,
  (b) at least a first ball means positioned in rolling contact with each of said discs, said ball means positioned to freely move between and momentarily center on each of said first and second rotational axes,
  (c) ball follower means positioned between said first and second discs and displaced by said ball means,
  (d) spring-loaded error detector means cooperating with said ball follower means and continuously urging said ball means to a null position in rolling contact with said discs, and
  (e) calibrated indicia means cooperating with said ball follower means so that the resulting ratio of the individual rates of each of said first and second discs is indicated.

2. The ratio indicator of claim 1 in which the rotational axes of said first and second discs are substantially parallel.

References Cited by the Examiner

UNITED STATES PATENTS

| | | | |
|---|---|---|---|
| 2,159,882 | 5/1939 | Borden | 235—61 X |
| 2,206,252 | 7/1940 | Gould | 235—61 X |
| 2,248,072 | 7/1941 | Fry | 235—61 X |
| 2,511,104 | 6/1950 | Eddy | 235—103.5 |
| 2,516,187 | 7/1950 | Diemel et al. | 235—61 X |
| 2,671,612 | 3/1954 | Coster | 235—61 X |
| 2,746,677 | 5/1956 | Stone | 235—61 |
| 2,935,311 | 5/1960 | Kabelitz | 235—103.5 X |

FOREIGN PATENTS 170,990  11/1921  Great Britain.

LOUIS J. CAPOZI, *Primary Examiner.*

LEO SMILOW, *Examiner.*

C. G. COVELL, J. G. MURRAY, *Assistant Examiners.*